VOLTAGE REGULATING SYSTEM

Filed Nov. 29, 1963 3 Sheets-Sheet 1

Inventor
Tage P. Sylvan
by Gilbert P. Tarleton
His Attorney.

VOLTAGE REGULATING SYSTEM

Filed Nov. 29, 1963 3 Sheets-Sheet 2

Inventor
Tage P. Sylvan
by
His Attorney.

Jan. 10, 1967 T. P. SYLVAN 3,297,938
VOLTAGE REGULATING SYSTEM
Filed Nov. 29, 1963 3 Sheets-Sheet 3

Inventor
Tage P. Sylvan
by Gilbert P. Tarleton
His Attorney.

United States Patent Office 3,297,938

Patented Jan. 10, 1967

3,297,938
VOLTAGE REGULATING SYSTEM

Tage P. Sylvan, Liverpool, N.Y., assignor to General Electric Company, a corporation of New York Filed Nov. 29, 1963, Ser. No. 327,034
17 Claims. (Cl. 323—43.5)

Figure 1:
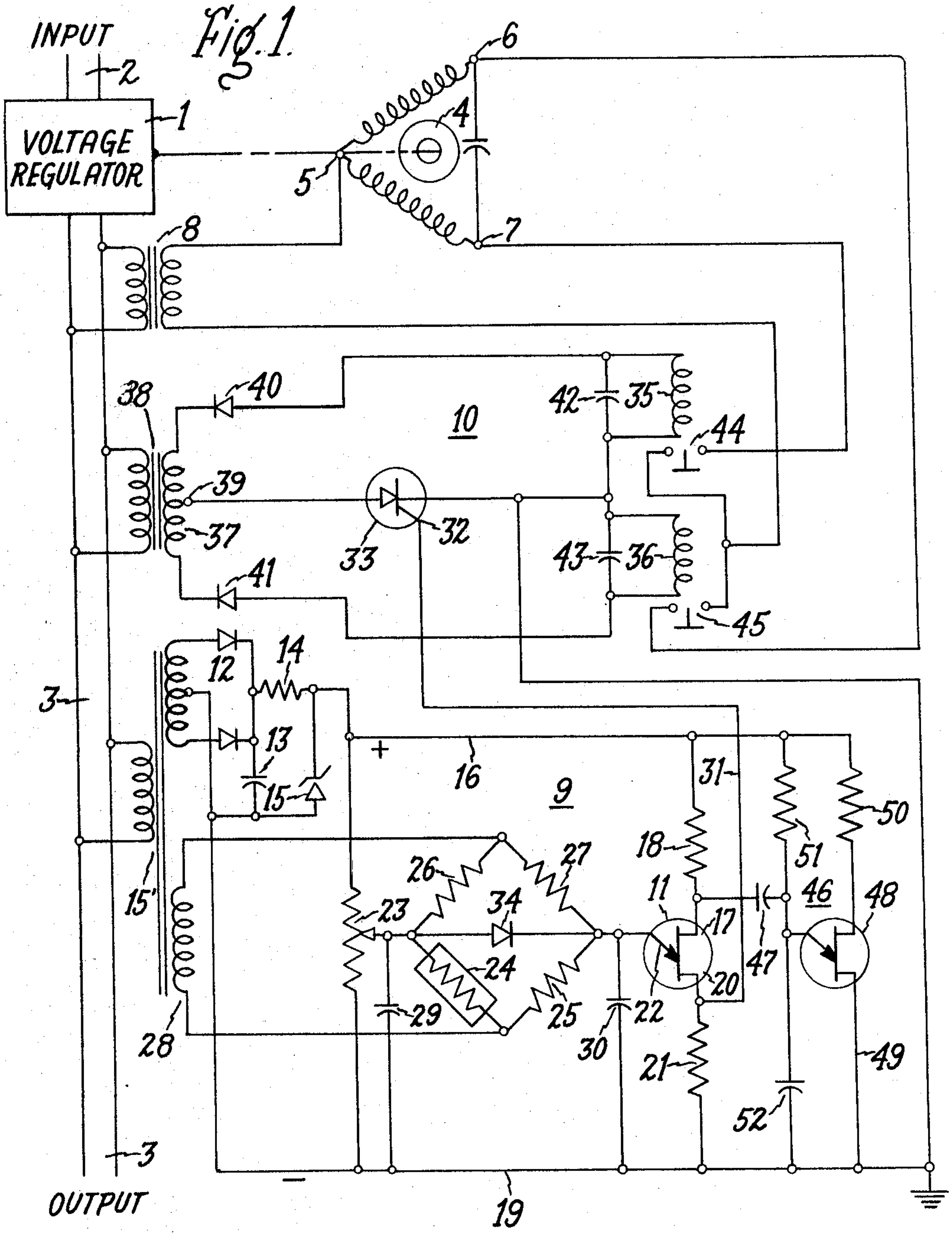

This is a continuation-in-part of a copending original application Serial No. 184,711, filed April 3, 1962, and assigned to the same assignee, now abandoned.

This invention relates to control circuits and more particularly to a compact and rugged solid state switching device static voltage sensing control circuit for reversible servo motor operated automatic regulators.

The circuit employs a single solid state switching device of the NPNP semiconductor type known to the art as a silicon controlled rectifier. This can be considered as a PNP transistor and NPN transistor with a common collector junction. Its structure and characteristics are described in detail in an article in The Proceedings of the Institute of Radio Engineers, volume 44, September 1956 entitled, "P-N-P-N Transistor Switches" by J. L. Moll, M. Tanenbaum, J. M. Goldey, and N. Holonyak. In common with other types of solid state switching devices or transistors this device is capable of controlling large amounts of current at several hundred volts and possesses inherent reliability, small size and high efficiency. As indicated above the semiconductive body has four zones, contiguous zones being of opposite conductive type and defining at least three P-N junctions. Electrodes are provided to the two end zones and one of the intermediate zones, the latter being called the gate electrode. This device differs from ordinary rectifiers in that it blocks current flow in the forward direction until a small signal is applied to the gate electrode. After the signal is applied to the gate electrode, the device continues to conduct in the forward direction even after the gate signal is removed. Conduction continues as long as the current remains greater than a minimum value called the "holding current." As soon as the current through the device drops below this holding current, the controlled rectifier reverts back to its forward blocking condition.

In the present invention, this device is phase controlled in response to deviations in regulated voltage from a desired value, through a double base solid state diode commonly called a unijunction transistor to energize respective raise and lower operating circuits for a servo motor which drives a regulator in the proper direction to cancel the voltage deviations.

Double base diodes have been described by Lesk, United States Patent 2,769,926 and Engel, United States Patent 2,907,934, both of which are assigned to the assignee of the present invention. Briefly it is a three-terminal device having a stable N-type negative resistance characteristic over a wide temperature range. It comprises a semiconductor body mounted between two ohmic base contacts with a P-type emitter near "base two." The device operates by conductivity modulation of the semiconductive material between the emitter and "base one" when the emitter is forward biased. In the nonconducting condition, the emitter and interbase power supplies established potentials between the base contacts and at the emitter such that the emitter is back biased. Between "base one" and "base two" electrodes the device exhibits characteristics of an ordinary resistance. As long as the emitter voltage is less than the "emitter peak point voltage," the emitter is reverse biased and substantially no current flows. When the emitter voltage exceeds this value and the emitter current is greater than the current corresponding to the the emitter peak point voltage, the device becomes conductive.

An object of the invention is to provide a new and improved control circuit.

Another object of the invention is to provide a unijunction transistor fired phase controlled silicon control rectifier for automatically controlling the direction of operation of a voltage regulator operating servo motor in response to variations in voltage.

An additional object of the invention is to provide a unijunction transistor firing circuit where the separate control of the quiescent voltage level of the emitter provides variable bandwidth setting independent of input error sensitivity.

A further object of the invention is to provide a pulsed excitation to the unijunction transistor such that emitter leakage currents do not limit the selection of higher impedance, high sensitivity, error inputs; and being independent of bandwidth setting except insofar as limiting minimal settings.

A still further object of the invention is to provide a synchronized sampling pulse excitation to the unijunction transistor for providing a filtering function.

An added object of the invention is to provide a compact and rugged transistor type static sensing and control circuit for automatic regulators.

The invention will be better understood from the following description taken in connection with the accompanying drawings and its scope will be pointed out in the appended claims.

Figure 2:
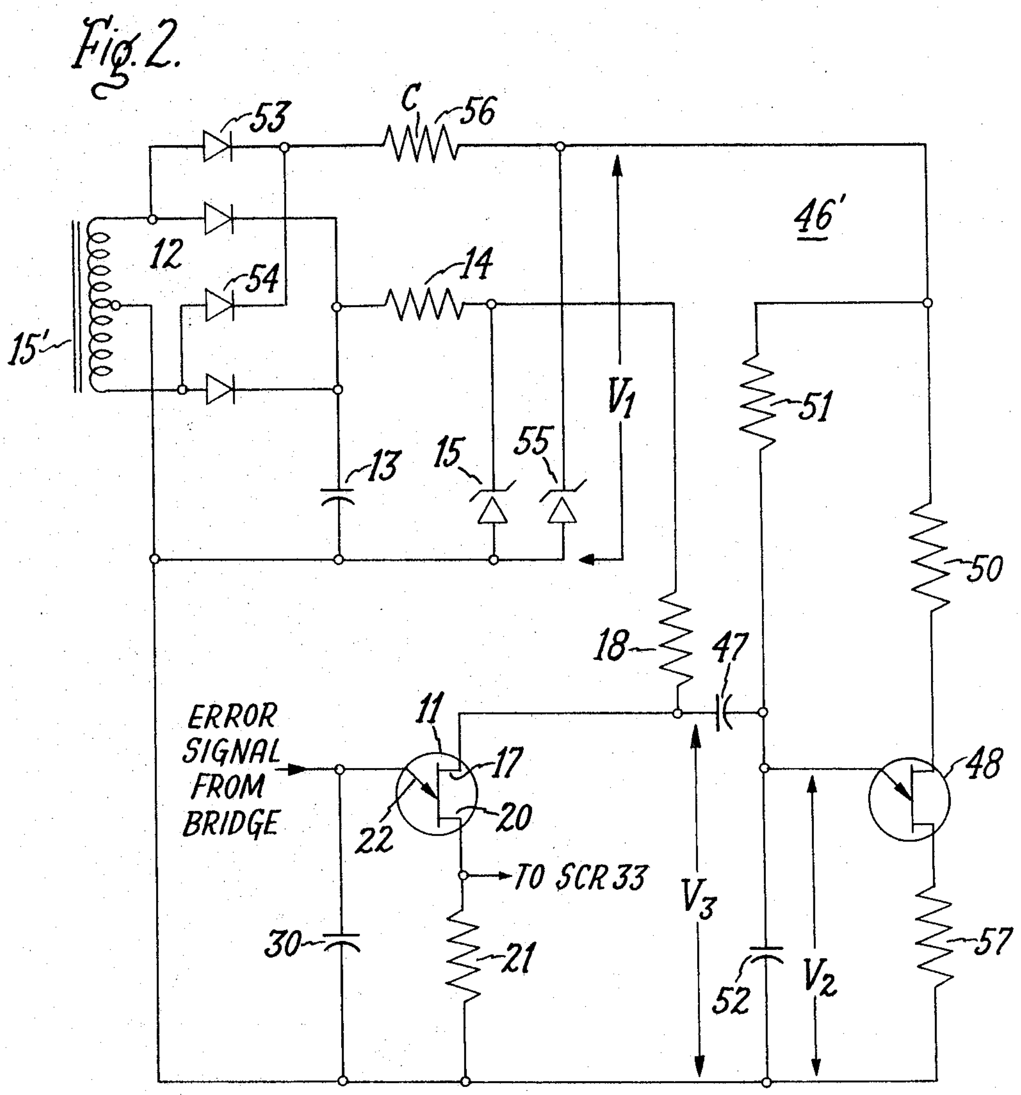

In the drawings, FIG. 1 is a diagrammatic illustration of an embodiment of the invention, FIG. 2 is a modification and FIGS. 3 through 7 are voltage wave diagrams for explaining the operation of FIG. 2.

Referring now to FIG. 1, there is shown therein a voltage regulator 1 connected between an unregulated input circuit 2 and a regulated output circuit 3. The regulator 1 may be any kind of reversible servo motor driven regulator such as an induction voltage regulator, a step voltage regulator, or a load tap changing transformer.

The motor for driving the regulator is indicated at 4. While it may be of any suitable type, the preferred form which is illustrated is an induction motor of the capacitor split-phase type having a common terminal 5 and forward and reverse rotation determining terminals 6 and 7 respectively. The source of current for the motor 4 may be a simple supply transformer 8 connected across the output circuit 3.

The voltage sensing and control circuit may be considered in two parts, namely a voltage sensing part 9 and an intermediate amplifier part 10 which is controlled by the sensing circuit 9 to in turn control the operation of the motor 4.

Referring now to subcircuit 9. This comprises a unijunction transistor 11 having a regulated unidirectional energization provided by a full wave rectifier 12 whose output is filtered by a capacitor 13 and a resistor 14 and whose output voltage is regulated by a zener diode 15. A description of the use of zener diodes in regulated power supplies is contained in the Bell Laboratories Technical Journal of July 1954, pages 827–858 entitled, "Transistors and Junction Diodes in Telephone Power Plants," by F. H. Case, B. H. Hamilton and D. H. Smith. This regulated direct current supply may be obtained from a secondary winding on a supply transformer 15' whose primary winding is connected across the alternating current output circuit 3. As shown, a conductor 16 from the positive polarity output of the regulated or reference direct current supply is connected to one base 17 (technically base two) of the unijunction transistor 11 through a resistor 18. Similarly a conductor 19 from the negative polarity side of the regulated or reference source of output voltage is connected to the other base 20 (technically base one) of the unijunction transistor 11 through a resistor 21. An emitter electrode 22 of the unijunction transistor 11 has an adjustable positive bias relative to the base 20 applied to it by means of an adjustable potentiometer 23 connected between the output conductors 16 and 19 of the regulated or reference source of direct current potential. The potentiometer is adjustable so that the bias on emitter 22 is either just below the firing value of the unijunction transistor (for minimum dead band), or by choice, sufficiently below the firing value to afford a useful dead band for reasons of system stability or simply to limit the frequency of corrective action. The firing value of the unijunction transistor is determined by the supply voltage and the intrinsic standoff ratio $\eta$, which normally is in the range of .51 and .75 depending on the particular type of unijunction transistor being used. As an example, if the supply voltage is 15 and $\eta$ is .60 the firing voltage will be approximately 9 volts. Thus the unijunction transistor will normally be in the unfired or nonconducting condition.

Resistors 24, 25, 26, and 27 form an alternating current bridge which is powered from the main output circuit 3 by means of another secondary winding 28 on the transformer 15'. The output from the bridge is superimposed on the direct current bias applied to the emitter 22 of the unijunction transistor. At least one of the resistors, indicated as 24, is a nonlinear resistor such as a thermistor whose resistance varies with temperature or current through it. If the bridge is balanced, there will be no alternating current signal at the emitter 22 of the unijunction transistor and consequently it will not fire. If the bridge is unbalanced, an alternating signal will appear at the emitter of the unijunction transistor causing the emitter to be biased above the firing voltage during certain half cycles of the alternating signal. The unijunction transistor will thus fire one or more times during these half cycles. Due to the polarity reversing effect of the bridge, the unijunction transistor will fire during half cycles of one polarity of the alternating current circuit 3 when the bridge is unbalanced in one direction, and will fire during the opposite half cycles of that voltage when the bridge is unbalanced in the other direction, that is to say when the voltage of the circuit 3 is above or below the desired value by a particular amount determined by the setting of the potentiometer 23.

Capacitors 29 and 30 which are normally charged by the direct current bias potential supplied to the emitter 22 from the potentiometer 23 are discharged through a resistor 21 when the unijunction transistor 11 is fired thus providing a pulse of current which is discharged through a conductor 31 in to the gate 32 of a silicon controlled rectifier 33 which is the principal element of the amplifier part 10 of the overall system.

The sensitivity of the circuit is quite high since the required trigger current for the unijunction transistor is very low (normally less than 5 microamperes) and the trigger voltage for the unijunction transistor is well defined and stable with temperature (normally stable to within 10 millivolts for moderate temperature ranges). If a high impedance bridge is used, the capacitor 30 may be kept small to prevent loading the bridge output and hence decreasing the overall sensitivity. Hence capacitor 30 is made as small as possible but large enough to permit the unijunction transistor to regenerate when the emitter voltage exceeds the firing voltage. A value of .01 microfarad to .001 microfarad is usually adequate for this purpose. Capacitor 29 is made large enough to generate a pulse large enough to trigger the silicon controlled rectifier 33 when the unijunction transistor 11 fires. A diode 34 is connected between the output terminals of the bridge in the path for the discharge of capacitor 29 and is for the purpose of preventing loading of the bridge during the half cycle when the emitter is positive with respect to the center arm of the potentiometer 23.

Resistor 18 is used to temperature compensate the firing voltage of the unijunction transistor. Increasing the resistance of 18 will cause the temperature coefficient of the firing voltage to increase. A value of the resistance of 18 can be determined for which the firing voltage becomes independent of the temperature.

Referring now to part 10 of the system, the silicon controlled rectifier 33 controls the starting, stopping and reversing of the motor 4 through a pair of relay coils 35 and 36 which are connected respectively to the ends of a secondary winding 37 of an auxiliary supply transformer 38 connected across the main output circuit 3. The circuits of the relay coils 35 and 36 have a common return through the anode-cathode circuit of the silicon controlled rectifier 33 to a midtap 39 on the secondary winding 37. Blocking diodes 40 and 41 are connected in circuit with relay coils 35 and 36 so as to prevent alternating current from flowing through them and in fact from preventing any current from flowing through them except through the anode-cathode circuit of the silicon controlled rectifier 33. A capacitor 42 is connected in shunt with the relay coil 35 and a capacitor 43 is connected in shunt with the relay coil 36. These are used to provide slight unidirectional bias to insure turning off the silicon controlled rectifier at the end of each half cycle. For some types of loads these capacitors may not be required. Normally open contacts 44 operated by the relay coil 35 are connected to the terminal 7 of the motor 4 and normally open contacts 45 are connected to the other terminal 6 of the motor 4.

It will be seen that winding 37, and diodes 40 and 41 constitute a biphase rectifier circuit with the loads 35 and 36 in its respective phases and with the silicon controlled rectifier in its common neutral connected to midtap 39.

The operation of the illustrated embodiment of the invention is as follows.

Assuming that the input circuit 2 is energized and that the voltage of the output circuit 3 is normal or within the desired dead band or bandwidth determined by the setting of potentiometer 23, the bridge circuit comprising the resistors 24 to 27 inclusive will either be balanced or so nearly balanced that the unijunction transistor 11 will not be fired. If, however, the voltage of the output circuit 3 deviates sufficiently from its desired value, the increase in unbalance of the bridge will reach a point where its output voltage added to the direct current bias voltage applied to the emitter 22 of the unijunction transistor 11 will fire the latter during either the positive or the negative half cycles of the voltage of the circuit 3. This in turn will fire the silicon controlled rectifier 33 during either the positive or the negative half cycles of the voltage of the circuit 3 thus causing either relay 35 or 36 to be energized and close its respective contacts which then energizes the motor 4 from the supply transformer 8 for operation in such a direction as to cause the voltage regulator 1 to reduce or cancel the deviation in voltage of the circuit 3 from the desired value and when this operation has continued long enough the output of the nonlinear resistor bridge will decrease to a point when the unijunction transistor 11 will no longer fire thus preventing firing of the silicon controlled rectifier 33 and causing whichever relay 35 or 36 has been picked up to drop out and stop the motor 4.

While the sensitivity of the sensing part 9 of the circuit as thus far described is quite high, it nevertheless requires the nonlinear bridge to provide an error current which exceeds the current of the emitter 22 of unijunction transistor 11 at the peak or firing point in order to fire the unijunction transistor 11. This burden on the nonlinear bridge can be greatly reduced by pulsing base two 17 of the unijunction transistor 11 negative by a fraction of a volt so as to allow the voltage to which the capacitor 30 has been charged by the error signal of the bridge, before it is limited by threshold current bled off by the emitter 22, to fire the unijunction transistor 11. This is particularly important when a high impedance bridge is used so as not unduly to load the regulator output.

One way of providing this pulsing so as to increase the sensitivity of the system is shown in FIGURE 1 as comprising a relaxation oscillator 46 connected across the D.C. stabilized voltage supply conductors 16 and 19 and coupled by a capacitor 47 to the base two 17 of the unijunction transistor 11. The relaxation oscillator circuit 46 is shown by way of example as comprising a second unijunction transistor 48 whose base one is connected to the negative D.C. supply line 19 by conductor 49 and whose base two is connected to the positive D.C. supply line 16 through a resistor 50. The emitter of the unijunction transistor 48 is connected to the junction of an R.C. circuit comprising a resistor 51 connected to the positive D.C. supply line 16 and a capacitor 52 connected to the negative or grounded D.C. supply line 19. The capacitor 47 is also connected to the junction between the resistor 51 and the capacitor 52.

The operation of this pulsing circuit is as follows. As the capacitor 52 is charged through the resistor 51 the potential of the emitter of the unijunction transistor 48 becomes more and more positive until the unijunction transistor 48 is fired whereupon the capacitor 52 is effectively short-circuited and discharged thus pulsing the potential of the emitter negative and starting the cycle over again. Due to the capacitive connection provided by the capacitor 47 the base two 17 of the unijunction transistor 11 is periodically pulsed negative by this action of the relaxation oscillator circuit so that the main regulator circuit is periodically triggered for operation by a relatively low error signal current produced by the nonlinear bridge.

The period or frequency of the oscillator circuit or negative pulses is not critical except that it should be at least twice as high, and preferably a substantially higher approximate even multiple, of the frequency of the bridge output when it is unbalanced. The amplitude of the negative pulses should be less than the difference between the bias potential and the potential which will fire the unijunction transistor 11, i.e. the pulses should not cause firing of the unijunction transistor 11 when the bridge is balanced.

It will, of course, be understood that many alternate ways of pulsing base two 17 of unijunction transistor 11 negative may be provided.

The above described sampling pulses can be used to perform a very important function in addition to the increase in sensitivity which is mentioned. If the pulse generator is synchronized with the A.-C. line in such a way that it fires once per each half cycle at a precise phase angle with respect to the line voltage, it can be shown that the circuit will perform a filtering function, rejecting harmonics and quadrature components of the line voltage depending on the phasing of the firing action. In addition to simplifying the circuit by elimination of filters, this will also permit a considerable improvement in performance over conventional filters with regard to rejection characteristics or response time. In effect, this is a sampling circuit with all the inherent advantages and none of the disadvantages of increased complexity and cost which are usually involved in sampling circuits.

A secondary advantage of such a synchronized pulsing circuit is that when the UJT 11 and the silicon controlled rectifier 33 fire they always fire at exactly the same phase angle as determined by the phase angle of the strobe pulse, hence there is much less tendency for the output control power to fluctuate as might be the case with the other circuit variations.

Figure 3:
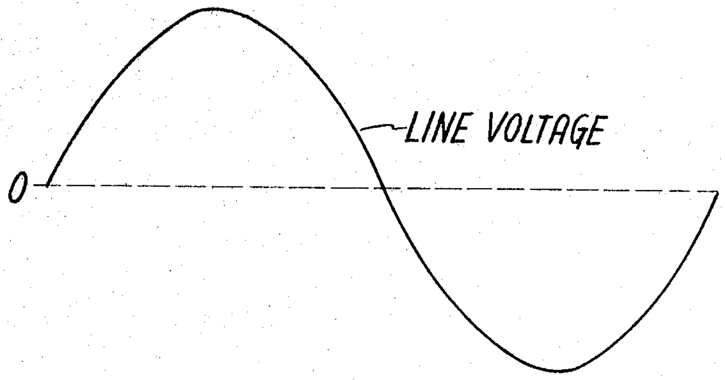
Figure 4:
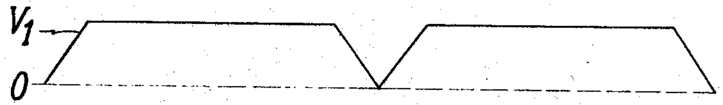
Figures 5, 6, 7:
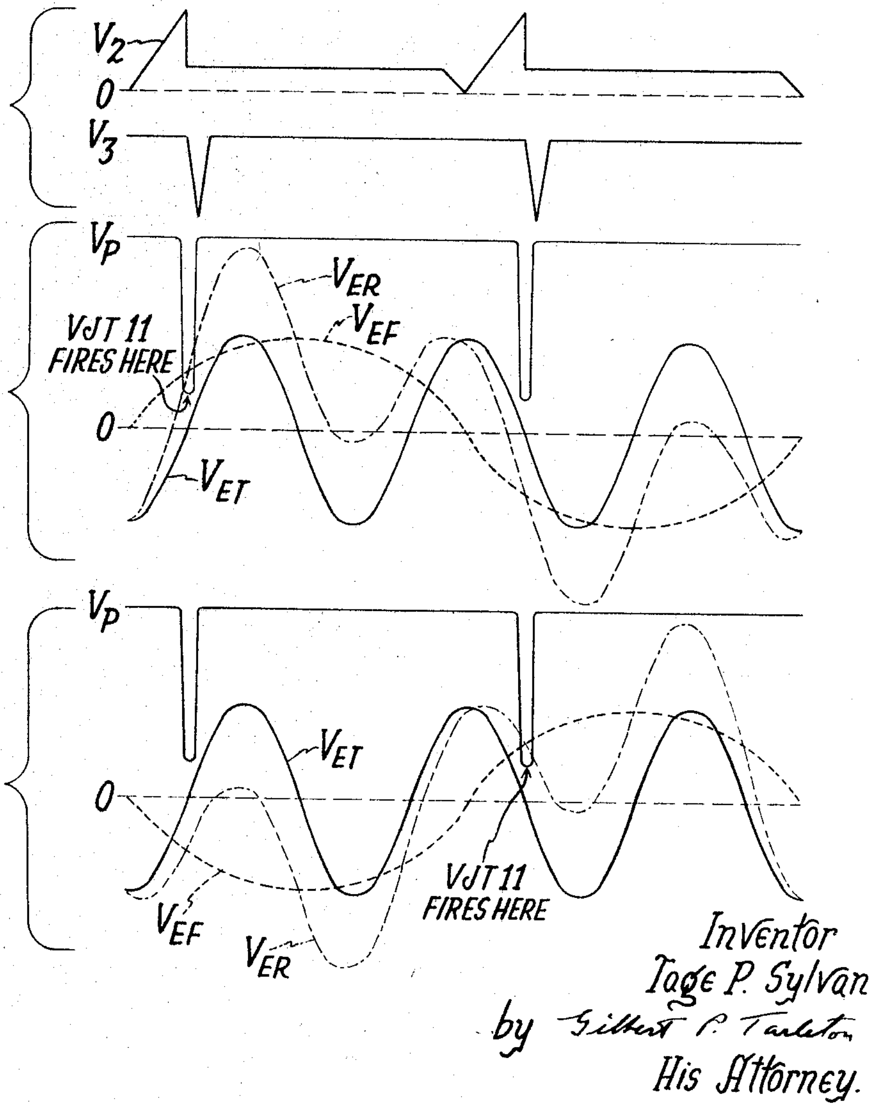

A suitable circuit which can be used to synchronize the pulsing with the A.-C. line is shown in FIG. 2. Although there are many different ways of generating such a pulse, there is shown in FIG. 2 a circuit which is practical, relatively inexpensive and generally similar to the non-synchronous pulsing circuit 46 shown in FIG. 1. Referring now to FIG. 2, the principal difference between it and FIG. 1 is that in the modified pulsing circuit 46' of FIG. 2 the bias for UJT 48 is obtained from a separate full wave rectified supply formed by rectifiers 53 and 54, zener diode 55 and resistor 56 energized by the same winding of transformer 15' used to provide power for rectifier 12. The supply for UJT 48 is not filtered, however, and consequently its voltage $V_1$ is a clipped full wave rectified waveform as shown in FIG. 4, FIG. 3 being the nominally sinusoidal line voltage wave. Emitter capacitor 52 is thus charged each half cycle through resistor 51 and when its voltage $V_2$ reaches the peak point voltage of UJT 48 this UJT fires and generates a negative pulse in $V_3$ through capacitor 47 at base two of UJT 11. FIG. 5 represents $V_2$ and $V_3$ graphically. The type of UJT used for 48 is selected together with the circuit values so that UJT 48 stays in the on state after it fires until the next line voltage zero so that only one pulse is generated each half cycle. Thus $V_2$ has the cyclic pattern shown in FIG. 5. This can be achieved by adding resistance 57 in series with base two of UJT 48 and using a value of resistance for 51 which is low enough to bias UJT 48 beyond the valley point.

The pulse generated at base two of UJT 11 momentarily reduces the peak voltage. If the instantaneous peak voltage drops below the instantaneous emitter voltage, UJT 11 will fire as described for FIG. 1. By choice of the firing angle of UJT 48, the emitter voltage of UJT 11 can thus be "sampled" at any desired time during the A.-C. cycle.

FIGS. 6 and 7 illustrate how this can be used to discriminate against a third harmonic present at the input, which is believed the major component of "noise" present in a thermistor bridge after the fundamental and its quadrature component are nulled out. In FIG. 6, $V_{ET}$ is the third harmonic output voltage of the thermistor bridge which is applied to emmiter 22 of UTJ 11. $V_P$ is a synchronized sampling pulse voltage of a type similar to $V_3$ in FIG. 5 but whose phase angle has been chosen to reject the third harmonic by making it coincide with zero voltage points of the third harmonic voltage wave $V_{ET}$. Note that in FIG. 6 the amplitude of the third harmonic $V_{ET}$ can increase without intersecting the sampling pulses $V_P$ and hence without firing UJT 11, whereas this would not be true with the circuit of FIG. 1 having unsynchronized pulses. If a small amount of fundamental frequency voltage $V_{EF}$ exists on the input due to the unbalance of the bridge, it will be superimposed on the third harmonic $V_{ET}$ to produce a resultant voltage $V_{ER}$ as shown in FIG. 6. As this figure shows the UJT will sense the fundamental exclusively and ignore the third harmonic, firing of the UJT occurring where the odd numbered pulses $V_P$ intersect $V_{ER}$. The ultimate sensitivity will be limited by the peak point stability of UJT 11, by the amplitude stability of the sampling pulses $V_P$ and by the phase stability of the sampling pulses.

FIG. 7 differs from FIG. 6 in that the polarity of the fundamental frequency error signal has been reversed indicating that the bridge has been unbalanced in the opposite direction as by a deviation in regulated voltage from its normal value in the opposite direction for that represented by FIG. 6. FIG. 7 shows the same kind of results so far as rejection of the third harmonic is concerned and shows that firing of the UJT 11 is now caused by intersection of the even numbered pulses $V_P$ and the resultant emitter voltage wave $V_{ER}$.

Other sources of waveform distortion than the third harmonic used as an example above can be discriminated against provided they exhibit phase stability. In practice, a simple empirical procedure can probably be best used to set the phasing of the sampling pulse rather than attempting a complicated waveform analysis of the error signal. For additional flexibility, simple means can be provided for adjusting the amplitude of the sampling pulse independently for each half cycle.

It will, of course, be obvious that the above described circuit is not limited to use in connection with voltage regulation and that any primary regulated quantity which can be made to unbalance the bridge circuit can be regulated by the above described system.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. In combination, an alternating current circuit having a variable quantity to be maintained constant, a source of undirectional reference potential, a unijunction transistor having a base one connected to the negative polarity side of said source, a base two connected to the the positive polarity side of said source, and an emitter means for impressing an adjustable fraction of said reference potential as a dead band controlling bias between said emitter and said base one of said unijunction transistor such that the emitter is positive relative to base one and said fraction of said reference potential is insufficient to fire said unijunction transistor, means for serially inserting in circuit with said emitter and base one a periodic potential whose magnitude is proportional to the magnitude of deviation of said quantity from a predetermined normal value, whose polarity is additive with respect to said bias potential and whose phase is determined by the direction of said deviation from said predetermined normal value whereby when said deviation attains a predetermined magnitude said unijunction transistor will fire repetitively during intervals of one phase if said deviation is in one direction and during intervals of opposite phase if said deviation is in the opposite direction, and means responsive to the phase of said repetitive intervals of firing of said unijunction transistor for regulating said quantity.

2. In combination, an alternating current circuit having a variable quantity to be maintained constant, a source of unidirectional reference potential, a unijunction transistor having a base one connected to the negative polarity side of said source, a base two connected to the positive side of said source, and an emitter, means for impressing an adjusctable fraction of said reference potential as a dead band controlling bias between said emitter and said base one of said unijunction transistor such that the emitter is positive relative to base one and said fraction of said reference potential is insufficient to fire said unijunction transistor, means including a nonlinear bridge circuit and a diode rectifier for serially inserting in circuit with said emitter and base one a periodic potential whose magnitude is proportional to the magnitude of deviation of said quantity from a predetermined normal value, whose polarity is additive with respect to said bias potential and whose phase is determined by the direction of said deviation from said predetermined normal value whereby when said deviation attains a predetermined magnitude said unijunction transistor will fire repetitively during intervals of one phase if said deviation is in one direction and during intervals of opposite phase if said deviation is in the opposite direction, and means responsive to the phase of said repetitive intervals of firing of said unijunction transistor for regulating said quantity.

3. In combination, an alternating current circuit having a variable quantity to be maintained constant, a source of unidirectional reference potential, a unijunction transistor having a base one connected to the negative polarity side of said source, a base two connected to the positive polarity side of said source, and an emitter, means for impressing an adjustable fraction of said reference potential as a dead band controlling bias between said emitter and said base one of said unijunction transistor such that the emitter is positive relative to base one and said fraction of said reference potential is insufficient to fire said unijunction transistor, means including a nonlinear bridge circuit and a diode rectifier for serially inserting in circuit with said emitter and base one a periodic potential whose magnitude is proportional to the magnitude of deviation of said quantity from a predetermined normal value, whose polarity is additive with respect to said bias potential and whose phase is determined by the direction of said deviation from said predetermined normal value whereby when said deviation attains a predetermined magnitude said unijunction transistor will fire repetitively during intervals of one phase if said deviation is in one direction and during intervals of opposite phase if said deviation is in the opposite direction, and means including a silicon controlled rectifier responsive to the phase of said repetitive intervals of firing of said unijunction transistor for regulating said quantity.

4. In combination, a reversible servo motor driven alternating current voltage regulator connected between an unregulated alternating current input circuit and a regulated alternating current output circuit, means including a rectifier-filter-zener diode assembly for deriving a unidirectional reference potential from one of said circuits, a unijunction transistor having a base one connected to the negative polarity side of said reference potential, said transistor having a base two connected to the positive polarity side of said reference potential, said transistor having an emitter, a potentiometer resistor connected between the opposite polarity sides of said reference potential, said potentiometer resistor having an adjustable sliding contact, a diode rectifier interconnecting said sliding contact and said emitter and being so poled as to apply an adjustable dead band determining positive polarity bias from said potentiometer to said emitter relative to said base one which is insufficient to fire said transistor, a bridge circuit at least one arm of which is a nonlinear impedance element, said bridge circuit having input terminals effectively connected across said output circuit and output terminals connected across said diode rectifier, said bridge circuit being balanced when the voltage of said output circuit is a predetermined normal value and being unbalanced in opposite directions responsive respectively to opposite direction deviation in the voltage of said output circuit from said predetermined normal value, the unbalancing of said bridge circuit producing an alternating potential across said diode whose phase reverses when the direction of said voltage deviation reverses, said diode preventing loading of said bridge circuit during positive half cycles of the alternating potential output of the unbalanced bridge and causing the arithmetical addition of said positive half cycles to said bias potential for firing said unijunction transistor, a capacitor connected between the negative side of said reference potential and the junction of said sliding contact and its electrically adjacent output terminal of said bridge circuit, means including a silicon controlled rectifier for controlling the direction of operation of said voltage regulator depending on the phase of the firing of said silicon controlled rectifier, and means for coupling said unijunction transistor to said silicon controlled rectifier to fire the latter in phase with the firing of the former.

5. In combination, a reversible servo motor driven alternating current voltage regulator connected between an unregulated alternating current input circuit and a regulated alternating current output circuit, means including a rectifier-filter-zener diode assembly for deriving a unidirectional reference potential from one of said circuits, a unijunction transistor having a base one connected through a voltage pulse producing resistor to the negative polarity side of said reference potential, said transistor having a base two connected to the positive polarity side of said reference potential, said transistor having an emitter, a potentiometer resistor connected between the opposite polarity sides of said reference potential, said potentiometer resistor having an adjustable sliding contact, a diode rectifier interconnecting said sliding contact and said emitter and being so poled as to apply an adjustable dead band determining positive polarity bias from said potentiometer to said emitter relative to said base one which is insufficient to fire said transistor, a bridge circuit at least one arm of which is a nonlinear impedance element, said bridge circuit having input terminals effectively connected across said output circuit and output terminals connected across said diode rectifier, said bridge circuit being balanced when the voltage of said output circuit is a predetermined normal value and being unbalanced in opposite directions responsive respectively to opposite direction deviation in the voltage of said output circuit from said predetermined normal value, the unbalancing of said bridge circuit producing an alternating potential across said diode whose phase reverses when the direction of said voltage deviation reverses, said diode preventing loading of said bridge circuit during positive half cycles of the alternating potential output of the unbalanced bridge and causing the arithmetical addition of said positive half cycles to said bias potential for firing said unijunction transistor, a capacitor connected between the negative side of said reference potential and the junction between said emitter and its electrically adjacent output terminal of said bridge circuit, means including a silicon controlled rectifier for controlling the direction of operation of said voltage regulator depending on the phase of the firing of said silicon controlled rectifier, and means including said pulse producing resistor for coupling said unijunction transistor to said silicon controlled rectifier to fire the latter in phase with the firing of the former.

6. In combination, a reversible servo motor driven alternating current voltage regulator connected between an unregulated alternating current input circuit and a regulated alternating current output circuit, means including a rectifier-filter-zener diode assembly for deriving a unidirectional reference potential from one of said circuits, a unijunction transistor having a base one connected through a voltage pulse producing resistor to the negative polarity side of said reference potential, said transistor having a base two connected through a temperature compensating resistor to the positive polarity side of said reference potential, said transistor having an emitter, a potentiometer resistor connected between the opposite polarity sides of said reference potential, said potentiometer resistor having an adjustable sliding contact, a diode rectifier interconnecting said sliding contact and said emitter and being so poled as to apply an adjustable dead band determining positive polarity bias from said potentiometer to said emitter relative to said base one which is insufficient to fire said transistor, a bridge circuit at least one arm of which is a nonlinear impedance element, said bridge circuit having input terminals effectively connected across said output circuit and output terminals connected across said diode rectifier, said bridge circuit being balanced when the voltage of said output circuit is a predetermined normal value and being unbalanced in opposite directions responsive respectively to opposite direction deviation in the voltage of said output circuit from said predetermined normal value, the unbalancing of said bridge circuit producing an alternating potential across said diode whose phase reverses when the direction of said voltage deviation reverses, said diode preventing loading of said bridge circuit during positive half cycles of the alternating potential output of the unbalanced bridge and causing the arithmetical addition of said positive half cycles to said bias potential for firing said unijunction transistor, a capacitor connected between the negative side of said reference potential and the junction of said sliding contact and its electrically adjacent output terminal of said bridge circuit, a second capacitor connected between the negative side of said reference potential and the junction between said emitter and its electrically adjacent output terminal of said bridge circuit, means including a silicon controlled rectifier for controlling the direction of operation of said voltage regulator depending on the phase of the firing of said silicon controlled rectifier, and means including said pulse producing resistor for coupling said unijunction transistor to said silicon controlled rectifier to fire the latter in phase with the firing of the former.

7. A combination as defined in claim 1 including means for applying negative polarity voltage pulses to said base two.

8. A combination as defined in claim 2 including means for applying negative polarity voltage pulses to said base two, the frequency of said pulses being at least equal to twice the frequency of said periodic potential.

9. A combination as defined in claim 3 including means for applying negative polarity voltage pulses to said base two, the frequency of said pulses being higher than the frequency of said periodic potential, the amplitude of said pulses being insufficient to cause firing of said unijunction transistor in the absence of said periodic potential.

10. A combination as defined in claim 4 including a relaxation oscillator circuit energized by the source of unidirectional reference potential, and means coupling said oscillator circuit to said unijunction transistor for applying negative polarity voltage pulses to said base two, the period of said oscillator circuit being higher than the frequency of said alternating current circuits, the amplitude of said pulses being insufficient to cause firing of said unijunction transistor when said nonlinear bridge is balanced.

11. A combination as defined in claim 5 including a relaxation oscillator circuit energized by the unidirectional reference potential, said oscillator circuit having a second unijunction transistor, and means for coupling said oscillator circuit to the first unijunction transistor including a capacitor for applying negative polarity voltage pulses to base two of the first unijunction transistor, the period of said oscillator circuit being higher than the frequency of said alternating current circuits, the amplitude of said pulses being insufficient to cause firing of the first unijunction transistor when said nonlinear bridge is balanced.

12. A combination as defined in claim 6 including a relaxation oscillator circuit comprising a pair of parallel branch circuits connected across the source of unidirectional reference potential, one branch being a resistor in series with the capacitor and with the capacitor connected to the negative side, the other branch being a resistor in series with the bases of a second unijunction transistor with the transistor connected to the positive side, the emitter of the second unijunction transistor being connected to the junction between the resistor and the capacitor of said one branch, and a capacitor connected between said junction and the base two of the first unijunction transistor.

13. A combination as defined in claim 1 including means for applying negative polarity voltage pulses to said base two which are synchronized with the voltage of said alternating current circuit.

14. A combination as defined in claim 2 including means for applying negative polarity voltage pulses to said base two, the frequency of said pulses being twice the frequency of said periodic potential, said pulses being synchronized with said periodic potential.

15. A combination as defined in claim 3 including means for applying negative polarity voltage pulses to said base two, said pulses being synchronized with said periodic potential so as to occur at zero voltage points in the third harmonic output of said bridge, the amplitude of said pulses being insufficient to cause firing of said unijunction transistor in the absence of said periodic potential.

16. A combination as defined in claim 4 including a voltage pulse producing circuit synchronously energized by said alternating current output circuit, and means coupling said pulse producing circuit to said unijunction transistor for applying negative polarity voltage pulses to said base two, the period of said pulses being twice the frequency of said alternating current circuits, the amplitude of said pulses being insufficient to cause firing of said unijunction transistor when said nonlinear bridge is balanced, the phase of said pulses coinciding with zero points in the third harmonic output voltage of said bridge.

17. A combination as defined in claim 5 including a voltage pulse producing circuit synchronously energized by one of said alternating current circuits, said voltage pulse producing circuit having a second unijunction transistor, and means for coupling said voltage pulse producing circuit to the first unijunction transistor including a capacitor for applying synchronized negative polarity voltage pulses to base two of the first unijunction transistor, the frequency of said pulses being twice the frequency of said alternating current circuits, the amplitude of said pulses being insufficient to cause firing of the first unijunction transistor when said nonlinear bridge is balanced, said pulses being phased to coincide with equally separated zero voltage points in the third harmonic output of said bridge.

References Cited by the Examiner

UNITED STATES PATENTS

| | | | |
|---|---|---|---|
| 3,097,314 | 7/1963 | Harriman | 307—88.5 |
| 3,123,763 | 3/1964 | Kettler | 323—43.5 X |
| 3,129,380 | 4/1964 | Lichowsky | 323—45 |
| 3,174,096 | 3/1965 | Lichowsky | 323—22 |

References Cited by the Applicant

UNITED STATES PATENTS

General Electric Semiconductor Products, Newsletter, vol. 2, No. 7, February 1958.

JOHN F. COUCH, *Primary Examiner.*

W. E. RAY, *Assistant Examiner.*